(12) United States Patent
Unnikrishnan et al.

(10) Patent No.: US 11,054,924 B2
(45) Date of Patent: Jul. 6, 2021

(54) USER INPUT DEVICES, PANELS FOR USE WITH A USER INPUT DEVICE AND COMPUTER PERIPHERAL DEVICES

(71) Applicant: RAZER (ASIA-PACIFIC) PTE. LTD., Singapore (SG)

(72) Inventors: Sreenath Unnikrishnan, Singapore (SG); Boon Sim Chong, Singapore (SG); Farrukh Raza Rizvi, Singapore (SG); Rafael Raymund Viernes, Singapore (SG); Pierre Zeloon Lye, Singapore (SG)

(73) Assignee: RAZER (ASIA-PACIFIC) PTE. LTD., Singapore (SG)

( * ) Notice: Subject to any disclaimer, the term of this patent is extended or adjusted under 35 U.S.C. 154(b) by 0 days.

(21) Appl. No.: 16/640,930

(22) PCT Filed: Sep. 5, 2017

(86) PCT No.: PCT/SG2017/050437
§ 371 (c)(1),
(2) Date: Feb. 21, 2020

(87) PCT Pub. No.: WO2019/050468
PCT Pub. Date: Mar. 14, 2019

(65) Prior Publication Data
US 2020/0209981 A1 Jul. 2, 2020

(51) Int. Cl.
*G06F 3/038* (2013.01)
*G06F 3/0354* (2013.01)

(52) U.S. Cl.
CPC .......... *G06F 3/038* (2013.01); *G06F 3/03543* (2013.01)

(58) Field of Classification Search
CPC combination set(s) only.
See application file for complete search history.

(56) References Cited

U.S. PATENT DOCUMENTS

| 7,924,266 B2 | 4/2011 | Larsen |
| 8,081,160 B2 | 12/2011 | Cheng et al. |

(Continued)

FOREIGN PATENT DOCUMENTS

| EP | 2426577 A1 | 3/2012 |
| JP | 2008-226220 A | 9/2008 |

OTHER PUBLICATIONS

Razer Naga Epic—Buy Gaming Grade Mice—Official Razer Online Store (Asia Pacific) https://www2.razerzone.com/ap-en/store/razer-naga-epic in 3 pages.

(Continued)

*Primary Examiner* — Deeprose Subedi
(74) *Attorney, Agent, or Firm* — Polsinelli PC

(57) ABSTRACT

According to various embodiments, there is provided a user input device including: a chassis including a socket configured to releasably receive a panel; a memory storing a plurality of button maps, wherein each button map of the plurality of button maps defines functions of at least one button of a respective panel of a plurality of panels, each of which being receivable in the socket; and a processor configured to read an identity code of the received panel, and further configured to identify a matching button map from the plurality of button maps based on the identity code, wherein the matching button map defines the functions of the at least one button of the received panel.

19 Claims, 7 Drawing Sheets

(56) References Cited

U.S. PATENT DOCUMENTS

| | | |
|---|---|---|
| 8,537,116 B2 | 9/2013 | Yang |
| 9,128,539 B2 | 9/2015 | Ng |
| 9,201,518 B2 | 12/2015 | Wang |
| 9,684,396 B2 | 6/2017 | Soelberg |
| 2006/0227109 A1 | 10/2006 | Lo |
| 2007/0132733 A1* | 6/2007 | Ram .................. G06F 3/03543 |
| | | 345/163 |
| 2008/0007527 A1 | 1/2008 | Sim et al. |
| 2008/0165123 A1 | 7/2008 | Segalle |
| 2008/0246727 A1 | 10/2008 | Larsen |
| 2010/0231514 A1 | 9/2010 | Min-Liang |
| 2011/0084906 A1 | 4/2011 | Wu |
| 2013/0328781 A1* | 12/2013 | Pate .................. G06F 3/03543 |
| | | 345/168 |
| 2017/0045959 A1* | 2/2017 | Chen .................. G06F 3/03543 |
| 2017/0220132 A1 | 8/2017 | O'Mahony et al. |

OTHER PUBLICATIONS

Asus ROG showcases complete gaming lineup at CES, VRZONE found at https://vrzone.com/articies/asus-rog-showcases-complete-gaming-lineup-cest/12001.html in 23 pages.
International Search Report and Written Opinion, dated Aug. 30, 2018, for the corresponding International Application No. PCT/SG2017/050437 in 8 pages.
Extended European Search Report dated Jul. 23, 2020, 7 pages, for the corresponding European Patent Application No. 17924356.3.

* cited by examiner

| BUTTON MAP | | | | 660 |
|---|---|---|---|---|
| | | 660c | 660b | 660a |
| EQUIVALENT KEYBOARD/ FUNCTION KEY | | PANEL 3 | PANEL 2 | PANEL 1 |
| 1 | | 1 | 1 | |
| 2 | | 2 | 2 | |
| 3 | | 3 | 3 | |
| 4 | | 4 | 4 | |
| 5 | | 5 | 5 | |
| 6 | | 6 | 6 | |
| 7 | | 7 | 7 | |
| 8 | | 8 | | |
| 9 | | 9 | | |
| 0 | | 10 | | |
| - | | 11 | | |
| = | | 12 | | |
| FORWARD | | | | 2 |
| BACK | | | | 1 |

USER INPUT DEVICES, PANELS FOR USE WITH A USER INPUT DEVICE AND COMPUTER PERIPHERAL DEVICES

TECHNICAL FIELD

Various embodiments relate to user input devices, panels for use with a user input device and computer peripheral devices.

BACKGROUND

There are many different types of computer mice available in the market, to suit different user preferences and different usage applications. For example, a simple mouse with two side buttons may suffice when the user is using a word processing application; whereas a gaming mouse with more than two side buttons may be preferably when the user is playing a video game where it is useful to have many side buttons that are pre-programmed to run macros in the video game. As a result, a user who often switches between different types of applications would need to purchase multiple computer mice in order to perform his tasks optimally. This would be a costly solution. Furthermore, he may need to re-program his computer mouse every time he uses a different computer mouse.

SUMMARY

According to various embodiments, there may be provided a user input device including: a chassis including a socket configured to releasably receive a panel; a memory storing a plurality of button maps, wherein each button map of the plurality of button maps defines functions of at least one button of a respective panel of a plurality of panels, each of which being receivable in the socket; and a processor configured to read an identity code of the received panel, and further configured to identify a matching button map from the plurality of button maps based on the identity code, wherein the matching button map defines the functions of the at least one button of the received panel.

According to various embodiments, there may be provided a panel for being releasably received in a socket of a user input device, the panel including: at least one button; a memory storing an identity code readable by a processor of the user input device; and a panel connector configured to transmit the identity code to the user input device.

According to various embodiments, there may be provided a computer peripheral device including: a user input device and a panel for being releasably received in a socket of a user input device; the user input device including: a chassis including a socket configured to releasably receive a panel; a memory storing a plurality of button maps, wherein each button map of the plurality of button maps defines functions of at least one button of a respective panel of a plurality of panels, each of which being receivable in the socket; and a processor configured to read an identity code of the received panel, and further configured to identify a matching button map from the plurality of button maps based on the identity code, wherein the matching button map defines the functions of the at least one button of the received panel; and the panel including: at least one button; a memory storing an identity code readable by the processor of the user input device; and a panel connector configured to transmit the identity code to the user input device.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which.

DESCRIPTION

Figure 1:
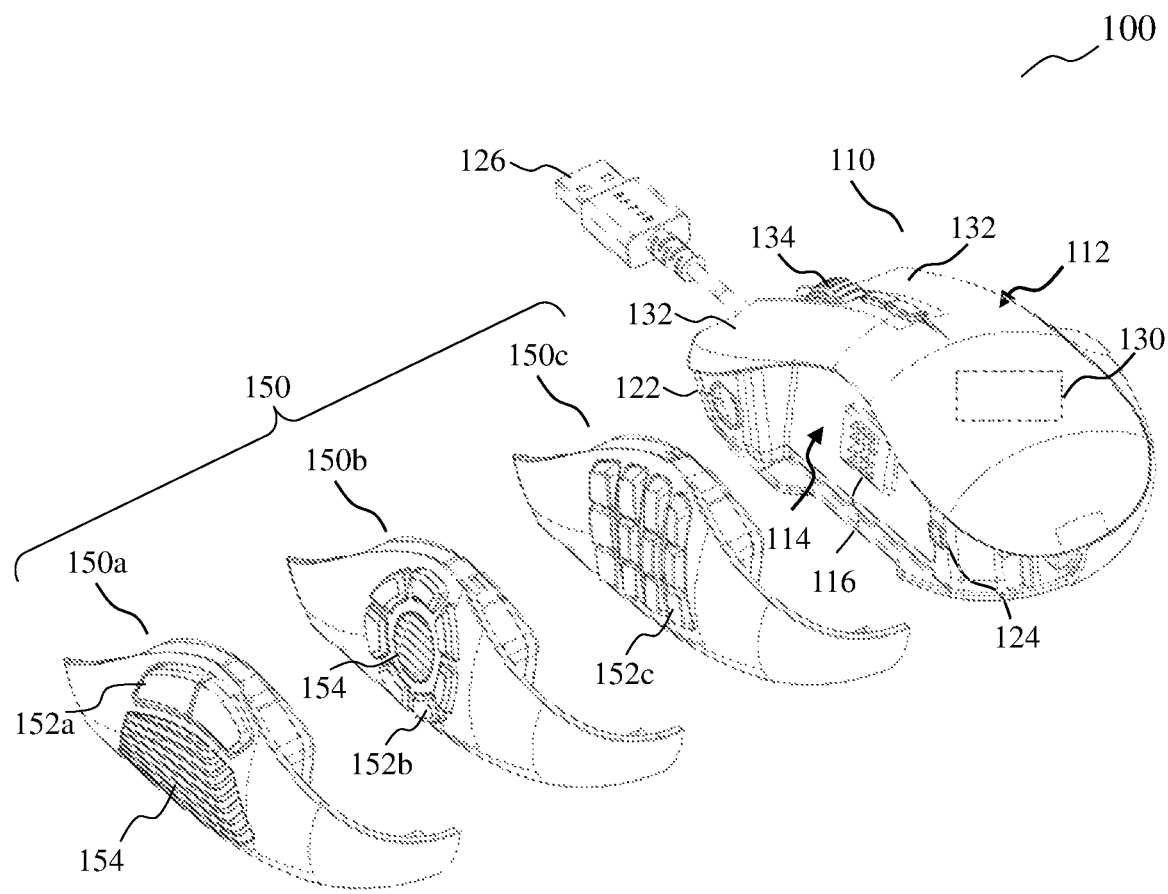
FIG. 1 shows a perspective view of a computer mouse and a plurality of side panels according to various embodiments.

It will be understood that any property described herein for a specific device may also hold for any device described herein. It will be understood that any property described herein for a specific method or process may also hold for any method or process described herein. Furthermore, it will be understood that for any device or method/process described herein, not necessarily all the components or steps described must be enclosed in the device or method, but only some (but not all) components or steps may be enclosed.

In this context, the user input device, the panel and the computer peripheral device as described in this description may include a memory which is for example used in the processing carried out in the device. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

In the specification, the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

The term "coupled" (or "connected") herein may be understood as electrically coupled or as mechanically coupled, for example attached or fixed, or just in contact without any fixation, and it will be understood that both direct coupling or indirect coupling (in other words: coupling without direct contact) may be provided.

Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. The reference to any conventional devices in this specification is not, and should not be taken as an acknowledgement or any form of suggestion that the referenced conventional devices form part of the common general knowledge in Australia (or any other country).

In order that the invention may be readily understood and put into practical effect, various embodiments will now be described by way of examples and not limitations, and with reference to the figures.

In the context of various embodiments, the phrase "interchangeable panel" may be but is not limited to being interchangeably referred to as a "panel".

According to various embodiments, a user input device with interchangeable panel may be provided. The panel may be interchanged, in other words, swapped for other types of panels. A variety of panels may be available, each with different buttons or keys, lighting or rubber grip configuration. For example, a first panel may include one button whereas a second panel may include more than one button, for example, a number pad. The first panel may be swapped for the second panel. The number pad may be very useful for gaming, for example, each number button may be programmed to perform a specific sequence of game actions. The second panel may also have a different lighting layout from the first panel. The second panel may also have a different type of rubber grip. The user input device may automatically detect the type of the new panel, for example, the user input device may recognise that the first panel is replaced by the second panel and that the second panel has a plurality of buttons. The user input device may also recognise the quantity of buttons on the second panel. The user input device may also automatically recognise the respective function of each button of the number pad, for example, that the "1" button should trigger a transmission of data containing the number "1" to the computing device. The user input device may further be able to link the function of the button to any user-programmed functions, for example the "1" button may trigger a macro, according to a user-profile associated with the panel or the user. Thus, the user input device may be easily transformed to suit different usages. Such a versatile user input device may save the user from the cost of owning multiple user input devices. The user input device may be a computer mouse, or any other type of user input device such as a keyboard, a joystick or a game controller.

FIG. 1 shows a perspective view 100 of a computer mouse 110 and a plurality of side panels 150 according to various embodiments. The computer mouse 110 may be an embodiment of the user input device described above. The computer mouse 110 may include a chassis 112. The chassis 112 may be an exterior casing of the computer mouse 110, and may also be referred herein as "housing". The chassis 112 may include a socket 114. The socket 114 may be an indentation or a concave segment formed integral to the chassis 112. The socket 114 may be shaped to receive a side panel 150. The chassis 112 may define an inner cavity to house or encase a plurality of internal components 130 of the computer mouse 110. The plurality of internal components 130 is illustrated in dashed lines in FIG. 1 to indicate that it may not be visible by virtue of being enclosed in the chassis 112. The position of the plurality of internal components 130 shown in FIG. 1 is merely illustrative and is not limiting as to the position of the internal components 130. The computer mouse 110 may also include at least one of top buttons 132, such as a left click button and a right click button; or a scroll wheel 134. The computer mouse 110 may also include an interface member 126 for communicating with a computing device. The interface member 126 may be a wired data connector, in other words a data cable. Examples of data cables may include Universal Serial Bus (USB) cable, PS/2 cable and IEEE 1394 (FireWire) cable. The interface member 126 may also be a wireless radio, such as a transceiver configured to receive data from and transmit data to, the computing device. The transceiver may be configured to transmit any one of Bluetooth, WiFi, ZigBee, infrared, Li-Fi signals or electromagnetic signals of any other dedicated frequency channel. The computer mouse 110 may also include a dots per inch (DPI) controller. The DPI controller may include a button for adjusting the sensitivity of the computer mouse 110. For example, the user may use the DPI controller to adjust the sensitivity of the computer mouse 110 from a low level to a high level, or vice-versa. The sensitivity of the computer mouse 110 may be measured in terms of DPI, in other words, the number of pixels that the cursor displayed on the computing device will shift in response to a movement of one inch by the computer mouse 110.

Each side panel 150 may be an embodiment of the interchangeable panel described above. The plurality of side panels 150 may include, for example, a first side panel 150a, a second side panel 150b and a third side panel 150c. The side panels 150 may each include buttons 152. The buttons 152 may be similar or identical to the top buttons 132. The buttons 152 may also be different types of buttons from the top buttons 132. The first side panel 150a may include two buttons 152a, and a grip panel 154. The grip panel 154 may include contoured lines to provide a slip-resistant surface. The grip panel 154 may be fabricated from an anti-slip material, such as a thermoplastic elastomer. The grip panel 154 may include any one of silicone, rubber, or plastic. The second side panel 150*b* may include a plurality of buttons 152*b* arranged around a centre point. The third side panel 150*c* may include four columns, each column including three buttons 152*c*. Each side panel 150 may be designed for a specific usage, for example for gaming, graphics design, or web surfing. Each side panel 150 may also have a different ergonomic profile, for example, the buttons 152 may be arranged at different positions to suit different hand sizes. Like shown in the examples of the first side panel 150*a*, the second side panel 150*b* and the third side panel 150*c*, each side panel 150 may have its own unique arrangement of the buttons and may have different types of buttons. The different types of buttons 152 may vary in shape and size, or may vary in terms of their underlying switches. The switches may include mechanical switches, membrane switches or any other types of switches. The buttons 152 may further include backlight, and the backlight may include a plurality of lighting elements such as light emitting diodes (LED). The lighting elements may be configured to light up in more than one colour. Further, the side panels 150 may have additional features such as the grip panel 154, or other input means such as scroll wheel, slider, touch pad, flip switch, number pads etc. It should be understood that the side panels 150 may vary in terms of the quantity of buttons 152, the arrangement layout of the buttons 152, and the presence of other features or other inputs means.

Any one side panel 150 of the plurality of side panels 150 may be fitted into the socket 114 like a jigsaw puzzle piece. When the side panel 150 is received or slotted into the socket 114, the computer mouse 110 may appear to be a regular computer mouse, as the socket 114 is obscured. Each of the side panel 150 and the computer mouse 110 may include retention means, also referred herein as retention members. The retention means may retain or hold the side panel 150 in the socket 114. The retention means may keep the side panel 150 adhered to the chassis 112. The retention means of the computer mouse 110, also referred herein as chassis retention member, may be arranged in the socket 114. The chassis retention member may include a magnetic retention member 122. The magnetic retention member 122 may include either a magnet, or a ferromagnetic material. The magnetic retention member 122 may be of any shape, any position in the socket, and may be exposed or hidden from the surface of the socket 114. The side panel 150 may include a corresponding magnetic retention member 322, arranged on an inner surface of the side panel 150 that faces the socket 114 when the side panel 150 is received in the socket 114. The magnetic retention member 122 and the corresponding magnetic retention member 322 may provide an attractive magnetic force between the chassis 112 and the side panel 150, to hold the side panel 150 within the socket 114. The chassis retention means may further include a mechanical snap latch. The mechanical snap latch may include a first latch member that is deformable or deflectable to engage a second latch member provided on the side panel 150. The chassis retention means may further include a panel guide 124. The panel guide 124 may include a groove or indentation that defines a cavity within the socket 114. The panel guide 124 may be of any shape or position, so long as it is shaped and positioned to receive an engagement member 324 arranged at the inner surface of the side panel 150. The panel guide 124 may include the mechanical snap latch. The engagement member 324 may include a rib or protrusion that is insertable into the cavity within the socket 114. Each of the side panel 150 and the computer mouse 110 may also include data connection means. The data connection means on the computer mouse 110, also referred herein as chassis connector 116, may include connection pins or a contact pad. The connection pins may be spring-loaded, for example, may be Pogo pins. The connector 116 may be exposed or visible on the surface of the socket 114. The chassis connector 116 may be configured to transmit data to, and receive data from, the side panel 150. The side panels 150 may also include a corresponding connector, also referred herein as a panel connector, configured to receive data from, and transmit data to, the computer mouse 110. The chassis connector 116 and the panel connector may be couplable to form a mating connection.

Figure 2A:
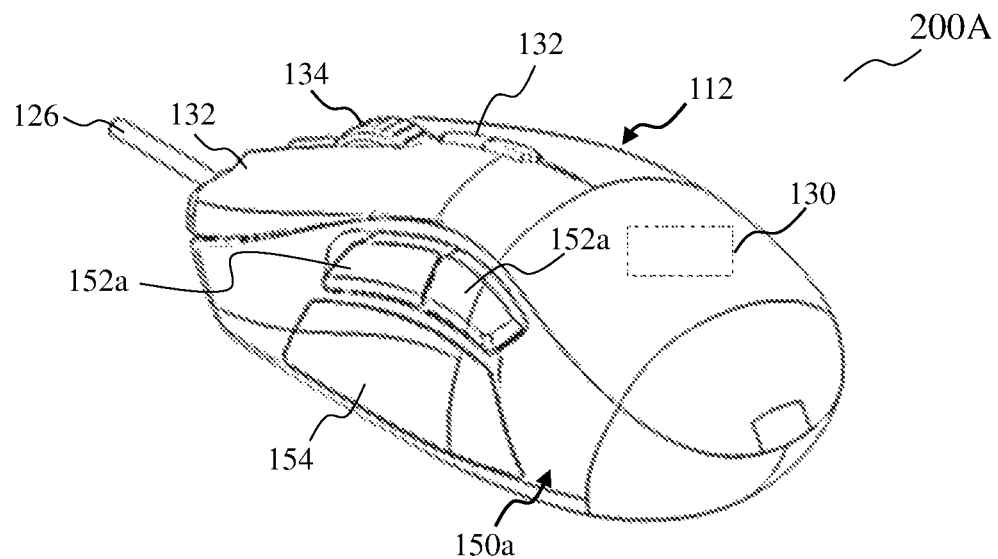
FIG. 2A shows a perspective view of the computer mouse assembled together with a side panel according to various embodiments.
Figure 2B:
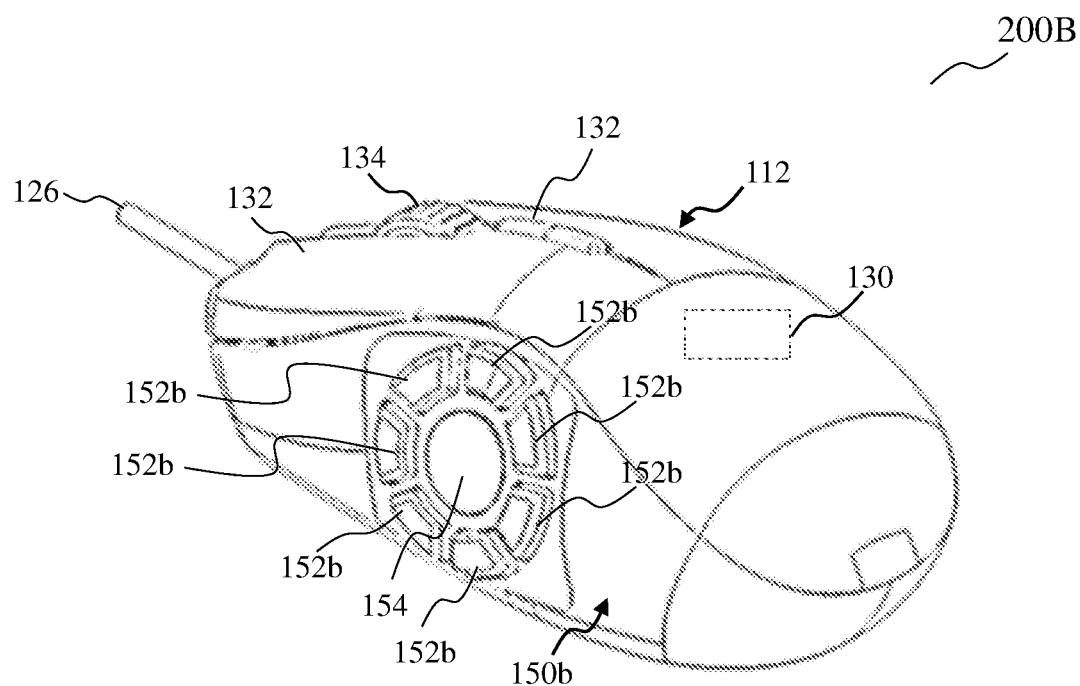
FIG. 2B shows a perspective view of the computer mouse assembled together with a side panel according to various embodiments.
Figure 2C:
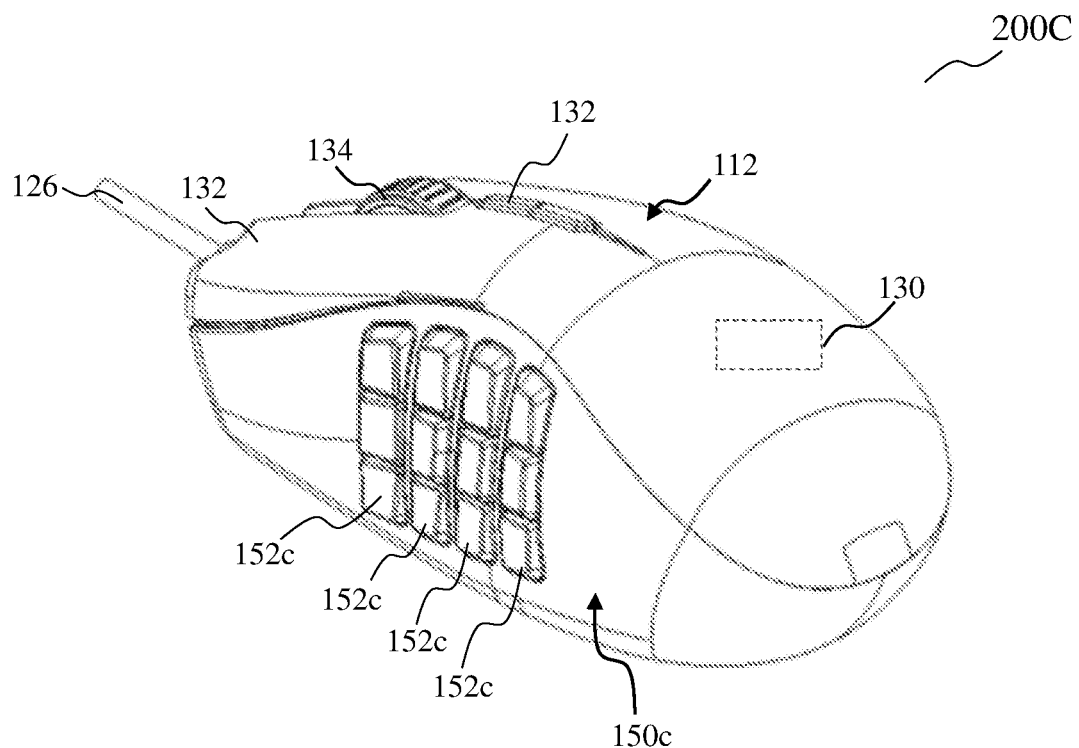
FIG. 2C shows a perspective view of the computer mouse assembled together with a side panel according to various embodiments.

FIGS. 2A-2C show that the same computer mouse 110 may be transformed into having different side buttons, by swapping the side panel 150. In the examples of FIGS. 2A-2C, the computer mouse 110 may be customized to have, for example two buttons, seven buttons or twelve buttons on the side, thereby providing the user with a wide range of button options at a low cost of owning only one computer mouse 110.

FIG. 2A shows a perspective view 200A of the computer mouse 110 assembled together with the first side panel 150*a* according to various embodiments. By connecting the first side panel 150*a* to the computer mouse 110, the computer mouse 110 may have another two buttons 152*a*. The two buttons 152*a* may include a forward button and a back button. The first side panel 150*a* may include a grip panel 154 where the user may rest his thumb. The first side panel 150*a* may include lights such as LEDs. The lighting effect of the LEDs may be customized using a companion software running in a computing device connected to the computer mouse 110.

FIG. 2B shows a perspective view 200B of the computer mouse 110 assembled together with the second side panel 150*b* according to various embodiments. The second side panel 150*b* may include seven buttons 152*b* arranged around a grip panel 154. Similar to the first side panel 150*a*, the second side panel 150*b* may also include LEDs. The LEDs may be arranged in a different layout from the LEDs of the third side panel 150*c*.

FIG. 2C shows a perspective view 200C of the computer mouse 110 assembled together with the third side panel 150*c* according to various embodiments. The third side panel 150*c* may include twelve buttons 152*c*. These buttons 152*c* may form a number pad. Similar to the first side panel 150*a* and the second side panel 150*b*, the third side panel 150*c* may also include LEDs.

The user may change the side panel 150 that is coupled to the computer mouse 110. The user may choose one side panel 150 that is the most comfortable for his hand, for example the correct type of rubber grip or the most preferred layout of the buttons. The user may also choose the side panel 150 according to the requirements of the application that he is using on the computing device. With the swappable side panels 150, the user's varied requirements may be met with just a single computer mouse 110.

Figure 3A:
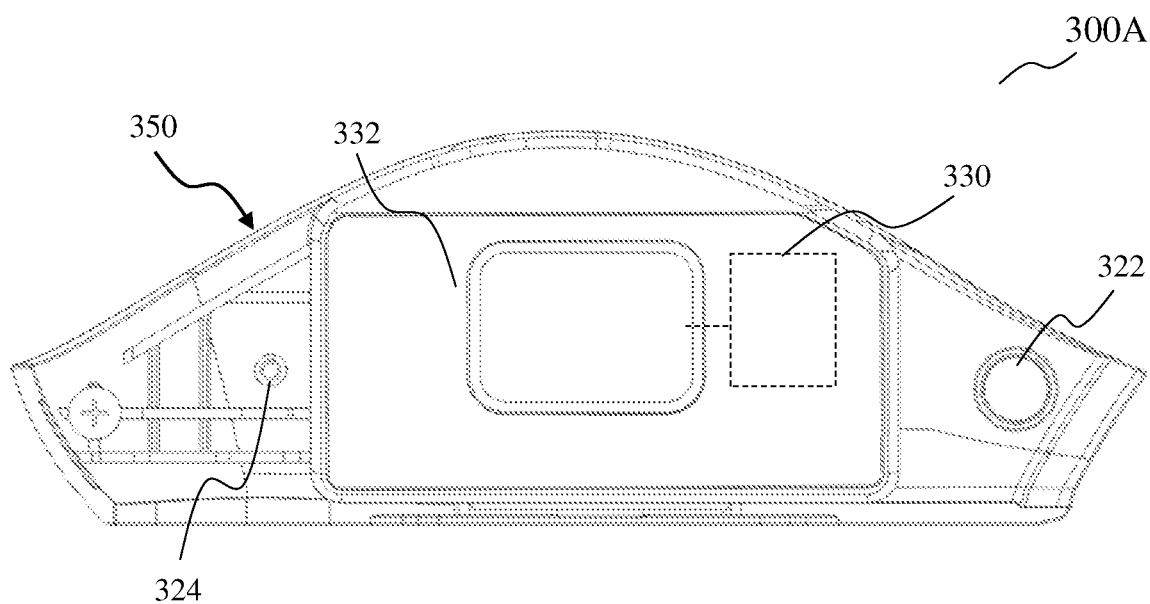
FIG. 3A shows a back view of a panel according to various embodiments.

FIG. 3A shows a side view 300A of a panel 350 according to various embodiments. The panel 350 may be identical to, or at least substantially similar to, the side panel 150. The side view 300A shows the inner surface of the panel 350, the inner surface being the surface of the panel that is hidden from view, when the panel 350 is received in the socket 114. The panel may include at least one panel retention member. The panel retention member may include a corresponding magnetic retention member 322. The corresponding magnetic retention member 322 may include a magnet or a ferromagnetic material. The panel retention member may also include an engagement member 324, also referred herein as a panel guide. The engagement member 324 may be inserted or received in the panel guide 124 in the socket 114. The positions of the panel retention members may be aligned with the positions of the chassis retention members. The panel 350 may also include a circuit board 330. The circuit board 330 is indicated in dashed lines in FIG. 3A to indicate that the circuit board 330 may not be visible by virtue of being enclosed in a holder 332. The position of the circuit board shown in FIG. 3A is merely illustrative and is not limiting as to the position of the circuit board 330.

Figure 3B:
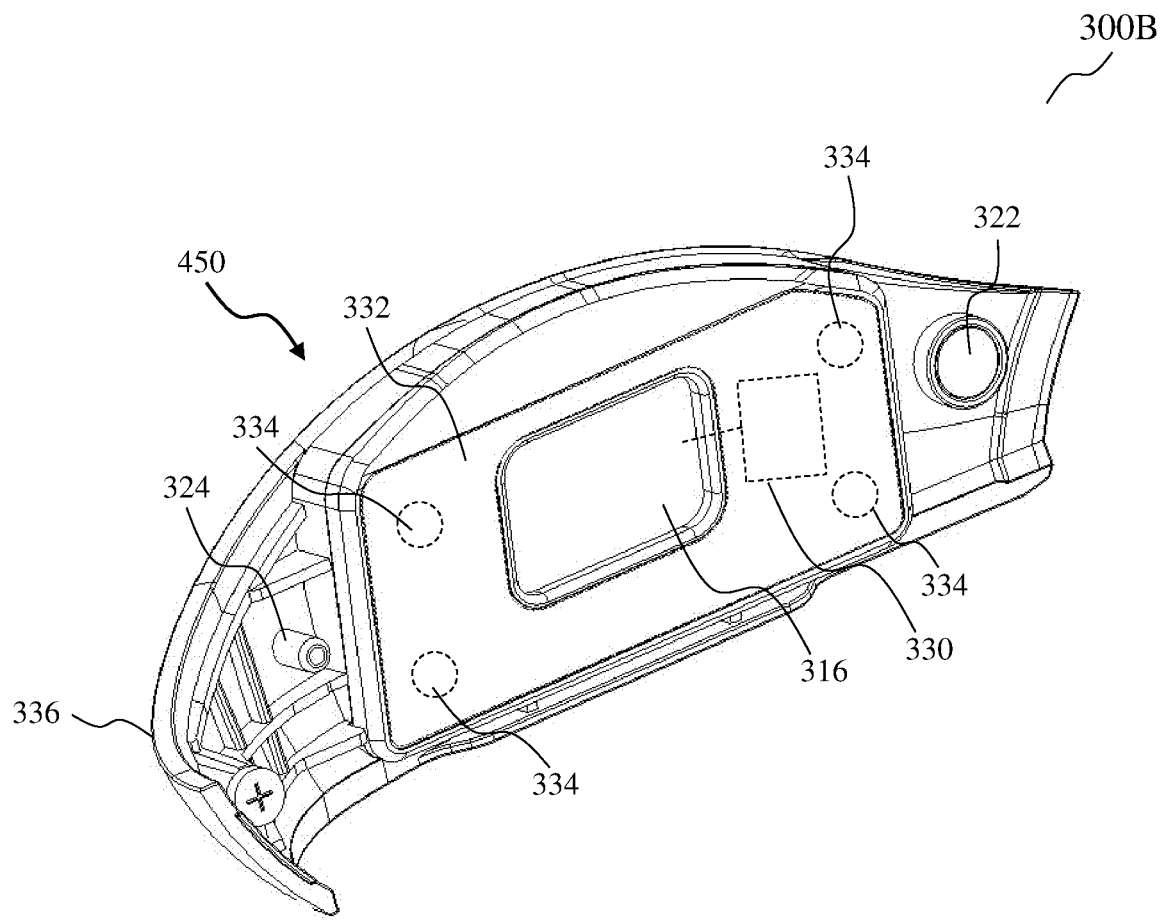
FIG. 3B shows a perspective view of the panel of FIG. 3A.

FIG. 3B shows a perspective view 300B of the panel 350 according to various embodiments. The panel 350 may also include a cover 336. The cover 336 may have an external surface where the buttons 152 are provided, and an internal surface where the holder 332 is provided. The holder 332 may be affixed to the cover 336, for example, by fasteners 334, such as screws. The fasteners 334 are indicated in dashed lines in FIG. 3B to indicate that the fasteners 334 may not be visible by virtue of being enclosed in the holder 332.

The circuit board 330 may include, or may be electrically coupled to, a panel connector 316 configured to communicate bidirectionally with the computer mouse 110. The circuit board 330 may further include a plurality of switches. Each switch of the plurality of switches may be mechanically coupled to a respective button 152 of the panel 350. When any one of the buttons 152 is operated, for example, pressed or clicked, the button 152 may actuate its respective switch. The switch when actuated, may send an electrical signal to the panel connector 316. The position of the panel connector 316 may be aligned with the position of the chassis connector 116. The panel connector 316 may include a contact pad or connection pins which may be spring-loaded, i.e. Pogo pins. The panel connector 316 may be complementary to the chassis connector 116. In other words, if the chassis connector 116 includes connection pins, the panel connector 316 may include a contact pad that is able to electrically connect to the connection pins. Alternatively, if the chassis connector 116 includes a contact pad, the panel connector 316 may include connection pins that may electrically connect to the contact pad.

It should be understood that the side panel 150 may be adapted to be other types of panels, for example a top panel, front panel, back panel or adapted to be fitted on any other positions of the chassis 112. The socket 114 in the chassis 112 may be accordingly adapted to receive the other types of panel.

Figure 4:
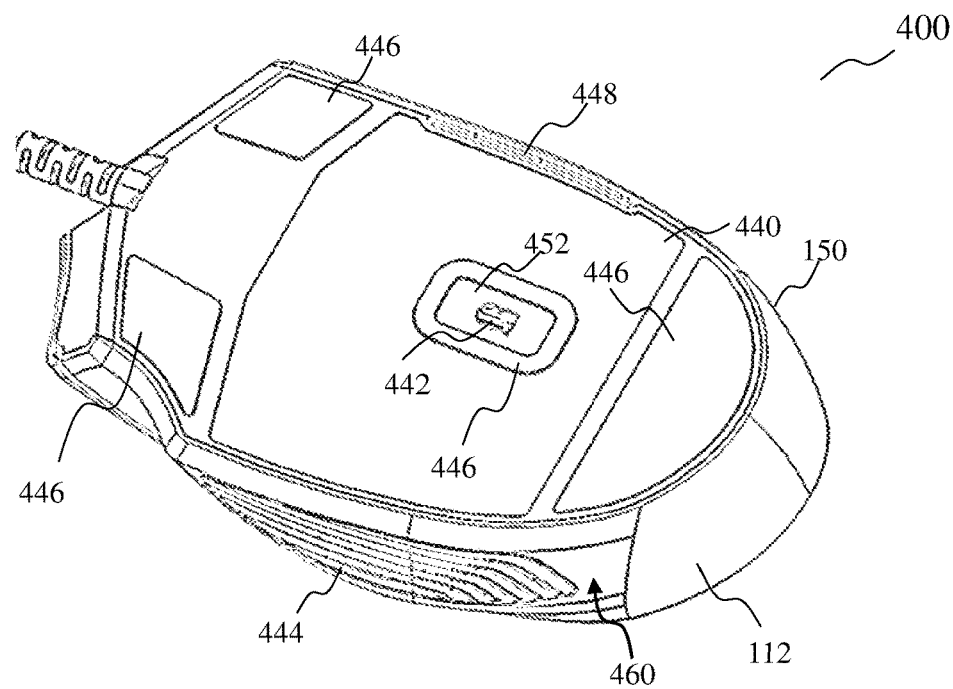
FIG. 4 shows a bottom perspective view of a computer mouse assembled with a panel according to various embodiments.

FIG. 4 shows a bottom perspective view 400 of a computer mouse 110 assembled with a panel 150, according to various embodiments. The panel 150 is only partially visible in the bottom perspective view 400. The computer mouse 110 may include a bottom cover 440. The bottom cover 440 may be formed integrally with the chassis 112, or may be a separately formed cover that can be coupled to the chassis 112 to form an enclosed cavity. The bottom cover 440 may include a notch 448 or recess on a side of the chassis 112 where the socket 114 is provided. The notch 448 may be provided so that a user may pull the side panel 150 away from the chassis 112, by placing his finger or fingernail in the notch 448. The bottom cover may alternatively, or additionally, include a release button that the user may depress to release the side panel 150. The bottom cover 440 may face a tracking surface when the computer mouse 110 is being used. At least one foot pad 446 may be provided on the bottom cover 440. The foot pad 446 may come into contact with the tracking surface when the computer mouse 110 is being used. The foot pad 446 may serve to elevate the bottom cover 440 such that there is a small distance between the bottom cover 440 and the tracking surface. The computer mouse 110 may include a tracking sensor 442. The tracking sensor 442 may be configured to track movements of the computer mouse 110. The tracking sensor 442 may track movements of the computer mouse 110 on a plane of the tracking surface. The tracking sensor 442 may translate the tracked movements into data indicative of the trajectory of the pointing computer mouse 110. The tracking sensor 442 may include at least one of a mechanical tracker, an optical tracker, a gyroscope or an accelerometer. If the tracking sensor 442 includes an optical tracker, the bottom cover 440 may include a light permeable window 452. The computer mouse 110 may further include a further side panel 460 opposing the socket 114, and also opposing the side panel 150. The further side panel 460 may be for example, on the right side of the computer mouse 110 whereas the socket 114 may be on the left side of the computer mouse 110. The further side panel 460 may also include buttons similar to the buttons 132 or the buttons 152. The further side panel 460 may also include a textured surface 444. The textured surface 444 may include a grip panel similar to the grip panel 154. The further side panel 460 may be formed integral to the chassis 112. Alternatively, the chassis 112 may include a further socket similar to the socket 114, for receiving the further side panel 460.

While the embodiments above show that the computer mouse 110 has a single socket 114 for receiving a single side panel 150, it should be understood that the quantity of sockets 114 is not limited to one. The chassis 112 may include more than one socket 114, at various positions of the chassis 112. Each socket 114 may releasably receive a side panel 150. As an example, the top buttons 132 may be provided on a top panel that can be detachably connected to the computer mouse 110. Both the left side and the right side of the computer mouse 110 may receive detachable side panels that include buttons 152.

Figure 5:
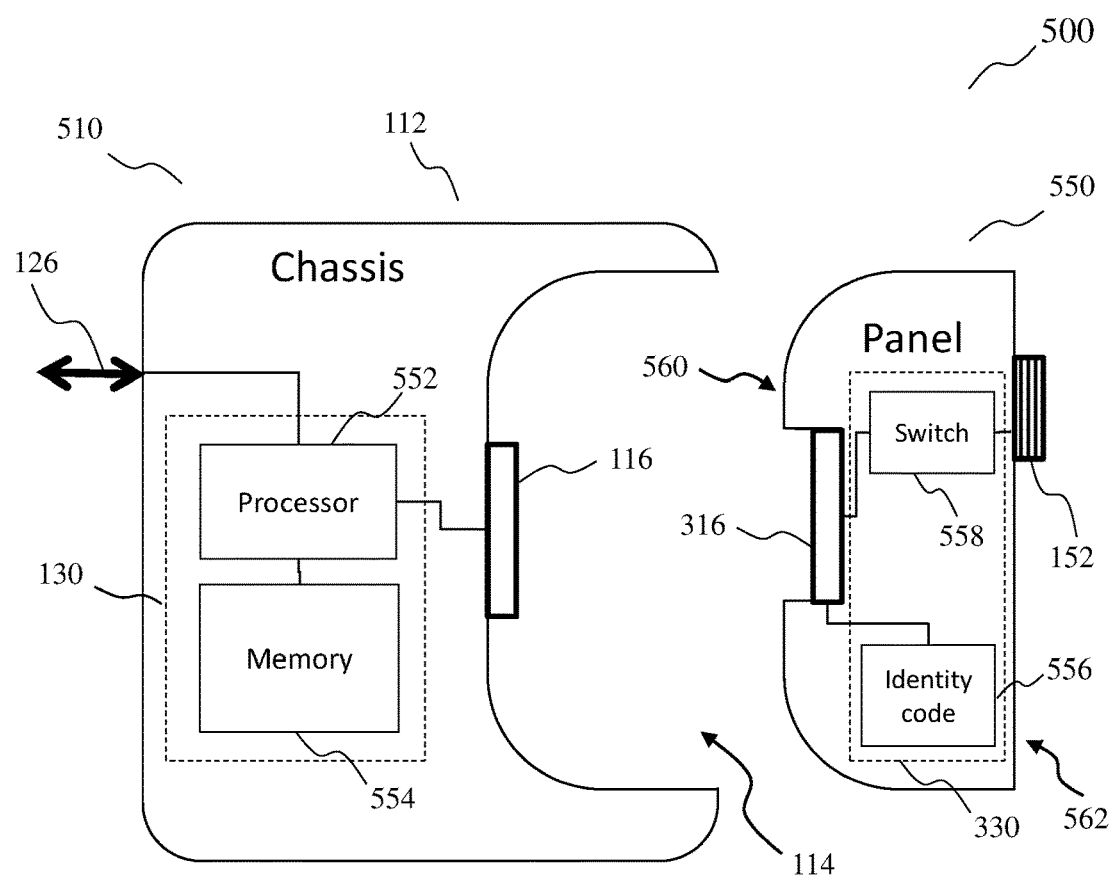
FIG. 5 shows a conceptual diagram of a computer peripheral device according to various embodiments.

FIG. 5 shows a conceptual diagram of a computer peripheral device 500 according to various embodiments. The computer peripheral device 500 may include a user input device 510 and a panel 550. The user input device 510 may be the computer mouse 110, or may be other types of user input devices such as a keyboard, a joystick or a game controller. The panel 550 may be identical to, or at least substantially similar to, the side panel 150, or the panel 350. The user input device 510 may include a chassis 112. The chassis 112 may include a socket 114. The socket 114 may releasably receive the panel 550. The socket 114 may also releasably receive many other panels 550, for example the first side panel 150a, the second side panel 150b and the third side panel 150c. The socket 114 may be an indentation or a concave segment formed integral to the chassis 112. The panel 550 may be shaped complementary to the socket 114. For example, an inner surface 560 of the panel 550 that faces the socket 114 when the panel 550 is received in the socket 114, may be convex. A chassis connector 116 may be provided in the socket 114, for connecting to a panel connector 316. The chassis 112 may house internal components 130. The internal components 130 may include a processor 552 and a memory 554. The processor 552 may be electrically coupled to the chassis connector 116 and the memory 554. The processor 552 may also be electrically coupled to an interface member 126. The memory 554 may store a plurality of button maps.

The panel 550 may include a button 152 on an outer surface 562 of the panel 550. The outer surface 562 may oppose the inner surface 560. The button 152 may be depressible or operable to actuate a switch 558. The panel 550 may also include further buttons 152 and further switches 558, wherein each switch 558 is paired with a respective button 152. When the switch 558 is actuated, the switch 558 may generate an electrical signal. The panel connector 316 may relay the electrical signal to the chassis connector 116. The panel 550 may also include an identity code 556. The identity code 556 may be stored on a panel memory, for example a memory integrated circuit. The switch 558 and the panel memory may be part of the circuit board 330.

When the panel 550 is received or installed in the socket 114, the panel connector 316 and the chassis connector 116 may be electrically connected such that data may be conveyed through these connectors in the form of electrical signals. The processor 552 may retrieve and read an identity code 556 of the panel 550. In other words, the processor 552 may automatically recognise or detect the identity or type of the panel 550. For example, the identity code 556 may include a model number of the panel 550, such that the identity code 556 is indicative of, or associated with, the quantity and type of the buttons 152 on panel 550. The identity code 556 may alternatively, or include in addition to the model number, a unique serial number of the panel 550. The serial number, by virtue of being unique and not stored in any other panel 550, may be indicative, or associated with, even more information than the model number. For example, the serial number may be indicative or associated with a particular user, or a particular user profile. The identity code 556 may also include a user identification that identifies the user. The processor 552 may identify a matching button map from the plurality of button maps stored on the memory 554, based on reading the identity code 556. The matching button map may define functions of the button 152 of the panel 550. In other words, the processor 552 may automatically configure the functions of the button 152 based on predefined settings when the panel 550 is installed in the socket 114. This feature provides a user with the convenience of being able to use the computer peripheral device 500 according to his pre-customised settings, instantly upon assembling the panel 550 and the user input device 510 together. The pre-customised settings may be programmed into the button maps. The pre-customised settings may include macros, for example, a first button may be mapped to a string of inputs on a keyboard such that when the first button is operated, the computing device receives command signals that are equivalent to the typing of the string of inputs on a keyboard.

Figures 6, 7:
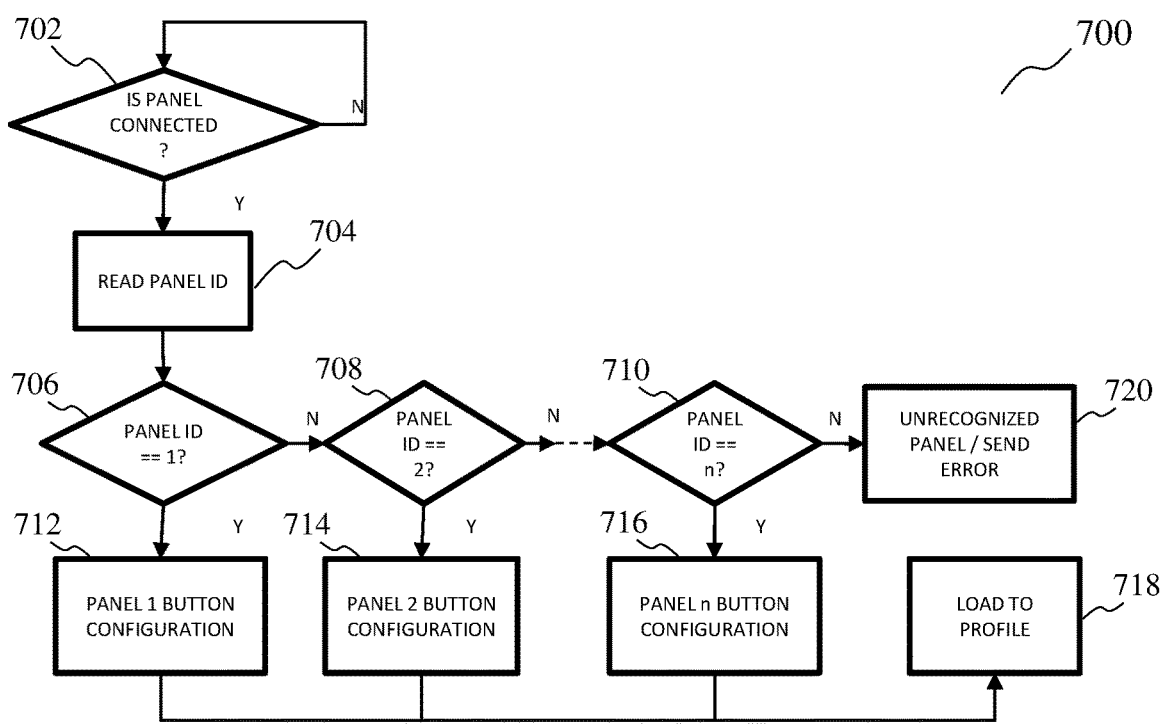
FIG. 6 shows a table including a plurality of button maps according to various embodiments.
FIG. 7 shows a flow chart that shows the process of panel recognition according to various embodiments.

FIG. 6 shows a table 600 including a plurality of button maps 660 according to various embodiments. As an illustrative example, the plurality of button maps 660 may include a first button map 660a, a second button map 660b and a third button map 660c. The first button map 660a may define functions of the buttons 152a of the first side panel 150a. The second button map 660b may define functions of the buttons 152b of the second side panel 150b. The third button map 660c may define functions of the buttons 152c of the third side panel 150c. Further button maps 660 may be created by the user, according to his personal preferences, for example, to map button 152a "1" to equivalent keyboard key "1" instead of "back" as defined in the first button map 660a. The plurality of button maps 660 may be stored in the memory 554 in the user input device 510. Further button maps 660 may also be downloaded into the memory 554.

The user may manually download new button maps 660 into the user input device 510, using a companion software running on a computing device connected to the user input device 510. The companion software may be a device driver software of the computer peripheral device 500. The processor 552 may also initiate downloads of new button maps 660 into the memory 554 when a new panel 550 is received in the socket 114. The processor 552 may search in the memory 554 for a button map 660 that matches the identity code 556 of the received panel 550. When the processor 552 cannot find a matching button map 660, the processor 552 may send an instruction to the computing device via the interface member 126, to request a download of the matching button map 660.

FIG. 7 shows a flow chart 700 that shows the process of panel recognition according to various embodiments. In 702, the processor 552 determines whether a panel 550 is connected to the user input device 510, in other words, received in the socket 114. If no panel 550 is connected, the process returns to 702. If a panel 550 is connected, the process proceeds to 704, where the processor 552 reads the identity code 556 of the connected panel 550. In 706, the processor 552 determines whether the identity code 556 contains a first code identifying the panel 550 to be the first side panel 150a. If the identity code 556 contains the first code, in 712, the processor 552 selects the first button map 660a out of the plurality of button maps 660, wherein the first button map 660a defines functions of the buttons 152a of the first side panel 150a. The process then proceeds to 718, where the first button map 660a is loaded into the device profile, i.e. the buttons 152a are configured according to the first button map 660a. If the identity code 556 does not contain the first code, the process goes to 708, where the processor 552 determines whether the identity code 556 contains a second code identifying the panel 550 to be the second side panel 150b. If the identity code 556 contains the second code, the processor 552 proceeds to select the matching button map 660, i.e. second button map 660b, in 714, similar to the process 712, and then proceeds to configure the buttons 152b of the panel in 718. If the identity code 556 does not contain the second code, the process goes to 710 to determine whether the identity code 556 contains the next code. The process may go on until the processor 552 identifies the identity code 556. The processor 552 may then select the matching button map 660 in 716 and then configure the buttons of the panel according to the matching button map 660 in 718. If the processor 552 cannot recognise the identity code 556, the process may go to 720, where the processor 552 flags out an error to the companion software. Alternatively, the processor 552 may instruct the companion software to download the matching button map 660, for example from a computing cloud or a server, or instruct the user to manually program the panel 550. The processes 706, 708, 710 may be performed sequentially, or simultaneously.

Figure 8:
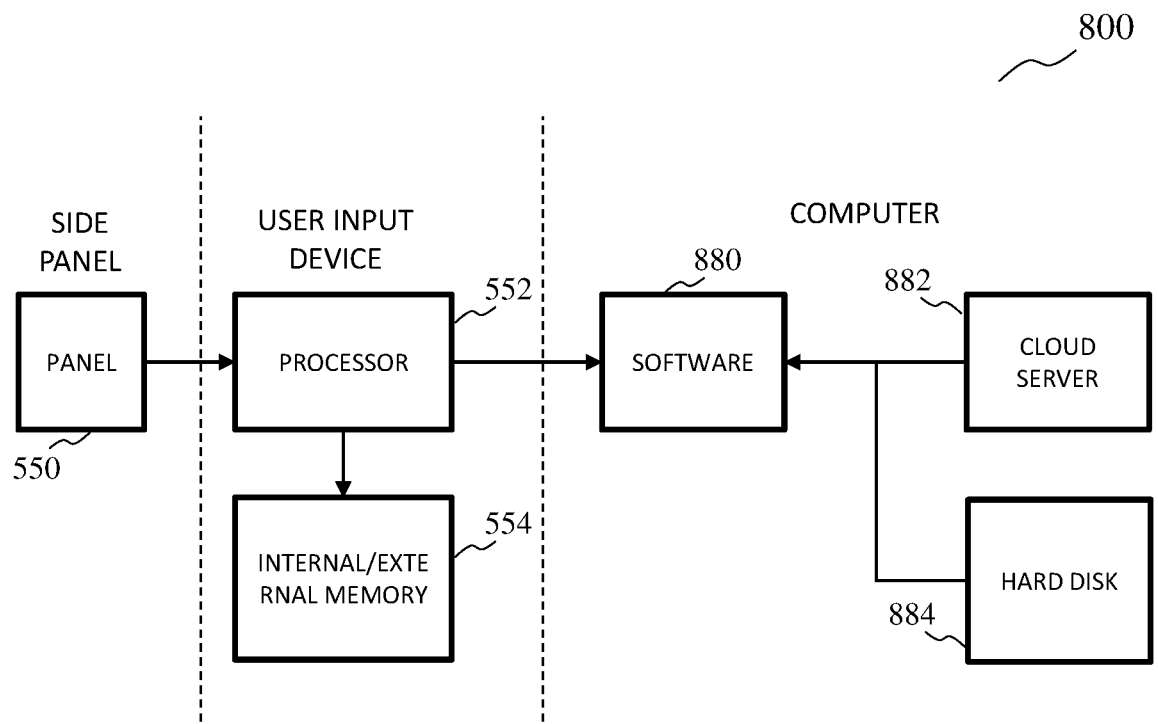
FIG. 8 shows a schematic diagram that shows the process of panel recognition according to various embodiments.

FIG. 8 shows a schematic diagram 800 that shows the process of panel recognition according to various embodiments. When the panel 550 is inserted into the socket 114 of the user input device 510, the processor 552 may retrieve the identity code 556 from the panel 550. The panel 550 may transmit its identity code 556 to the processor 552 via the panel connector 316 and the chassis connector 116. The processor 552 may read the identity code 556 and may send instructions to the memory 554 to search for a button map 660 that corresponds to the identity code 556. The memory 554 may reside within the user input device 510. The memory 554 may be an internal memory of the processor 552. Alternatively, the memory 554 may be an external memory, i.e. an extended memory, for example an EEPROM or flash memory that is connected to the processor 552. Alternatively, or in addition, the processor 552 may also send instructions to the companion software 880, to retrieve a corresponding button map 660 from other sources. The companion software 880 may download the corresponding button map 660 from a cloud server 882, or from a hard disk 884. The hard disk 884 may reside in the computer, also referred herein as computing device. The processor 552 may configure the buttons 152 on the panel 550, according to the retrieved corresponding button map 660. The button map 660 may define the function of each button 152 on the panel 550. The button maps 660 may be provided by the manufacturer of the panel 550, or may be programmed or customised by the user using the companion software 880. The button maps 660 may be associated with the user's user profiles. For example, the user may create his user profile that is associated with the user input device 510 and a plurality of panels 550. The user may program at least one button map 660 for each panel 550 associated with his user profile. When the user logs into this user profile, for example by a login user name and password, or by simply connecting his user input device 510 to the computer, the plurality of button maps 660 associated with his user profile may be loaded into the computer or into the memory 554. In summary, the user input device 510 may automatically detect any panel 550 that is inserted into the socket 114, and may configure the buttons of the panel 550 according to saved user profiles for each panel 550. The user profiles and the button maps 660 may be saved in at least one of the user input device 510 (for example the memory 554), in the computer system (for example in the hard disk 884), or in the cloud server 882. To use the panel 550 together with the user input device 510, the user simply has to insert the panel 550 into the socket 114 and the panel 550 may be ready for use and already configured according to the existing saved user profiles.

Figure 9:
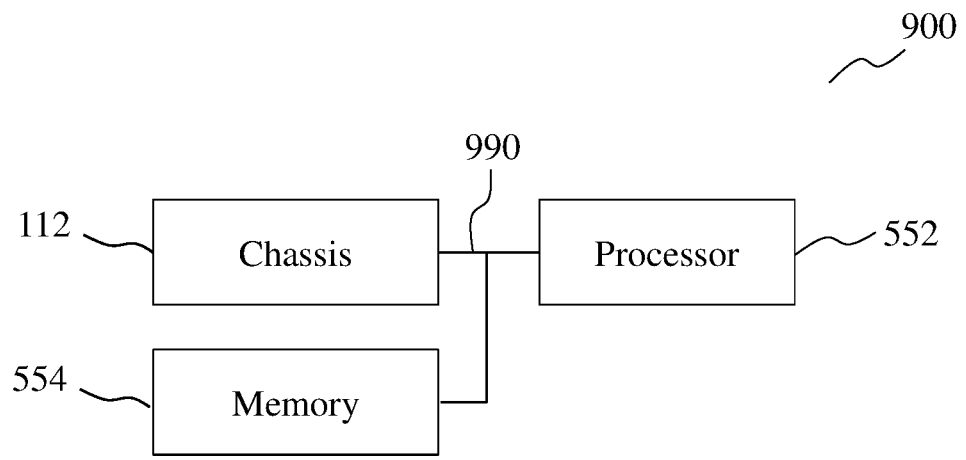
FIG. 9 shows a conceptual diagram of a user input device according to various embodiments.

FIG. 9 shows a conceptual diagram of a user input device 900 according to various embodiments. The user input device 900 may include a chassis 112 including a socket configured to releasably receive a panel. The user input device 900 may also include a memory 554 storing a plurality of button maps. Each button map of the plurality of button maps may define functions of at least one button of a respective panel of a plurality of panels. Each panel of the plurality of panels may be receivable in the socket. The user input device 900 may also include a processor 552 configured to read an identity code of the received panel, and may be further configured to identify a matching button map from the plurality of button maps based on the identity code, wherein the matching button map defines functions of the at least one button of the received panel. The chassis 112, the processor 552, and the memory 554 may be coupled with each other, like indicated by lines 990, for example electrically coupled, for example using a line or a cable, and/or mechanically coupled.

In other words, according to various embodiments, the user input device 900 may include a chassis 112, a memory 554 and a processor 552. The user input device may include, or may be part of, the computer mouse 110 or the user input device 510. The chassis 112 may be the housing of the user input device 900 such that it protects the internal components of the user input device 900 from dust, humidity and other environmental elements. The chassis 112 may include a socket. The socket may be configured to releasably receive a panel, in other words, the socket may receive a panel therein, and may also release the panel from the socket. The panels may each include at least one button. The panel may be selected from a plurality of panels. Each panel of the plurality of panels may include at least one button. The panels of the plurality of panels may have different arrangement or layouts of buttons. For example, a first panel of the plurality of panels may have a different number of buttons from a second panel of the plurality of panels. The first panel may have different types of buttons from the second panel. The memory 554 may store a plurality of button maps. Each button map of the plurality of button maps may define functions of the buttons of a respective panel of the plurality of panels. The processor 552 may be configured to read an identity code of the panel received in the socket. The processor 552 may also identify a matching button map from the plurality of button maps based on the identity code of the received panel. The matching button map may be the button map that defines functions of the at least one button of the received panel. The processor 552 may be further configured to transmit the identity code to a computing device and further configured to receive a user profile associated with the identity code from the computing device. The processor 552 may be configured to identify the matching button map based on the received user profile. The matching button map may be part of the received user profile. When the at least one button of the received panel is operated, the processor 552 may be configured to determine a message to be transmitted to the computing device, based on the button that is operated and further based on the matching button map. The processor 552 may also be configured to download the plurality of button maps from at least one of the computing device or a computing cloud, to the memory 554. The user input device 900 may be one of a computer mouse, a keyboard, or a joystick.

Figure 10:
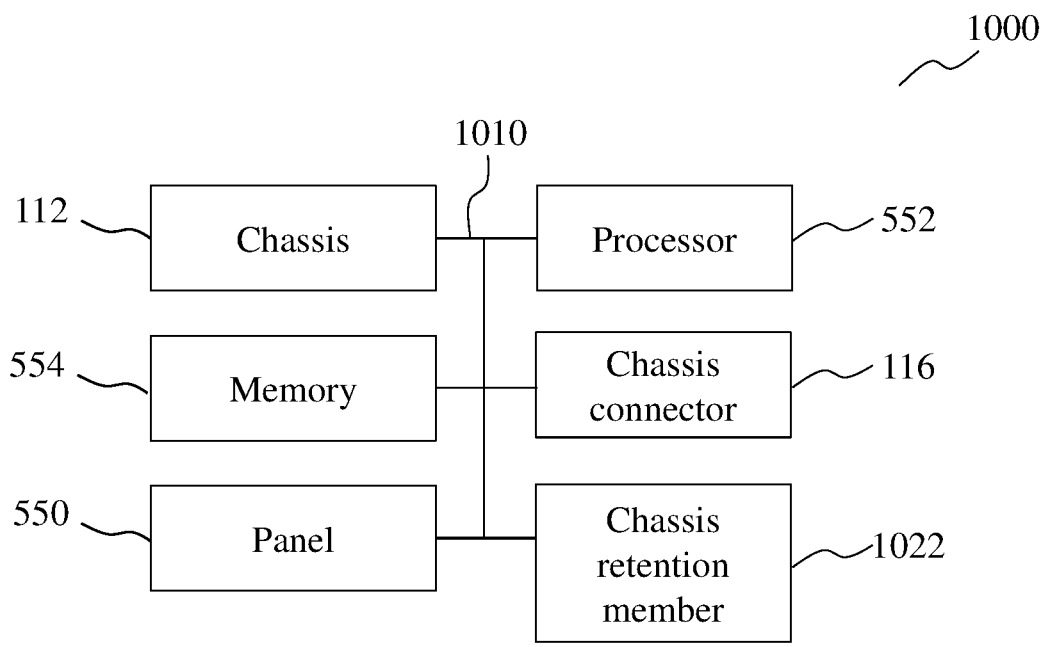
FIG. 10 shows a conceptual diagram of a user input device according to various embodiments.

FIG. 10 shows a conceptual diagram of a user input device 1000 according to various embodiments. The user input device 1000 may include the user input device 900. In addition, the user input device 1000 may further include a chassis connector 116 in the socket. The chassis connector 116 may be configured to bidirectionally communicate with the received panel. The chassis connector 116 may include spring-loaded pins, such as Pogo pins. The chassis connector 116 may be configured to connect to a panel connector of the received panel. The user input device 1000 may also include a chassis retention member 1022 in the socket. The chassis retention member 1022 may be configured to retain the received panel in the socket. The chassis retention member 1022 may include at least one of the magnetic retention member 122 and the panel guide 124. The chassis retention member 1022 may include at least one of magnet or ferromagnetic material for magnetically attracting the received panel, for example in the magnetic retention member 122. The chassis retention member 1022 may additionally, or alternatively, include an indentation for receiving a rib from the panel. The indentation may be the panel guide 124.

The user input device 1000 may also include at least one panel 550 from the plurality of panels 550. The panel 550 may include, or may be part of, the side panel 150, or the panel 350. The chassis 112, the processor 552, the memory 554, the chassis connector 116, the chassis retention member 1022 and the at least one panel 550, may be coupled with each other, like indicated by lines 1010, for example electrically coupled, for example using a line or a cable, and/or mechanically coupled.

Figure 11:
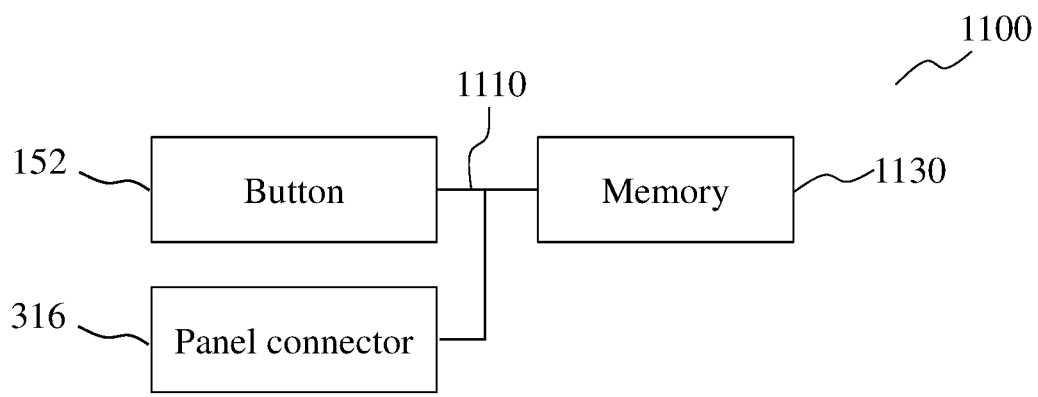
FIG. 11 shows a conceptual diagram of a panel for being releasably received in a socket of a user input device, according to various embodiments.

FIG. 11 shows a conceptual diagram of a panel 1100 for being releasably received in a socket of a user input device, according to various embodiments. The panel 1100 may include, or may be part of, the side panel 150, the panel 350 or the panel 550. The panel 1100 may include at least one button 152, a memory 1130, and a panel connector 316. The memory 1130 may store an identity code readable by a processor of the user input device. The memory 1130 may be part of the circuit board 330. The identity code may correspond to a matching button map stored in the user input device, wherein the matching button map may define functions of the at least one button 152. The panel connector 316 may be configured to transmit the identity code to the user input device. The panel connector 316 may be configured to bidirectionally communicate with the user input device. The panel connector 316 may be connectable to the chassis connector 116. The panel connector 316 may be arranged on a first side of the panel 1100. The at least one button 152 may be arranged on a second side of the panel 1100. The second side may oppose the first side. The at least one button 152, the memory 1130, and the panel connector 316 may be coupled with each other, like indicated by lines 1110, for example electrically coupled, for example using a line or a cable, and/or mechanically coupled.

Figure 12:
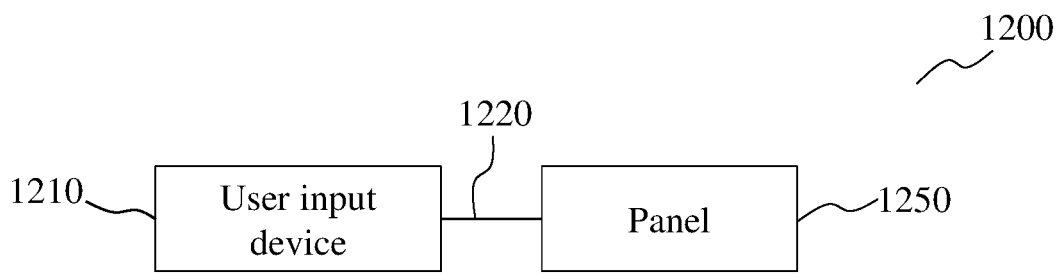
FIG. 12 shows a conceptual diagram of a computer peripheral device according to various embodiments.

FIG. 12 shows a conceptual diagram of a computer peripheral device 1200 according to various embodiments. The computer peripheral device 1200 may include, or may be part of, the computer peripheral device 500. The computer peripheral device 1200 may include a user input device 1210 and a panel 1250. The user input device 1210 may include, or may be part of, any one of the computer mouse 110, the user input device 510, the user input device 900 or the user input device 1000. The panel 1250 may include, or may be part of, any one of the side panel 150, the panel 350, the panel 550, or the panel 1100. The user input device 1210 and the panel 1250 may be coupled with each other, like indicated by the line 1220, for example electrically coupled, for example using a line or a cable, and/or mechanically coupled.

The following examples pertain to further embodiments.

Example 1 is a user input device including: a chassis including a socket configured to releasably receive a panel; a memory storing a plurality of button maps, wherein each button map of the plurality of button maps defines functions of at least one button of a respective panel of a plurality of panels, each of which being receivable in the socket; and a processor configured to read an identity code of the received panel, and further configured to identify a matching button map from the plurality of button maps based on the identity code, wherein the matching button map defines the functions of the at least one button of the received panel.

In example 2, the subject-matter of example 1 can optionally include that the processor is further configured to transmit the identity code to a computing device and further configured to receive a user profile associated with the identity code from the computing device, wherein the processor is configured to identify the matching button map based on the received user profile.

In example 3, the subject-matter of example 2 can optionally include that the received user profile includes the matching button map.

In example 4, the subject-matter of any one of examples 1 to 3 can optionally include that upon operation of one button of the at least one button of the received panel, the processor is further configured to determine a message to be transmitted to a computing device, based on the button that is operated and further based on the matching button map.

In example 5, the subject-matter of any one of examples 1 to 4 can optionally include that the plurality of panels includes a first panel and a second panel, wherein the first panel has a different number of buttons from the second panel.

In example 6, the subject-matter of any one of examples 1 to 5 can optionally include that the plurality of panels includes a first panel and a second panel, wherein the first panel has different types of buttons from the second panel.

In example 7, the subject-matter of any one of examples 1 to 6 can optionally include: a chassis connector in the socket, the chassis connector configured to bidirectionally communicate with the received panel.

In example 8, the subject-matter of example 7 can optionally include that the chassis connector includes spring-loaded pins.

In example 9, the subject-matter of any one of examples 7 to 8 can optionally include that the chassis connector is configured to connect to a panel connector of the received panel.

In example 10, the subject-matter of any one of example 1 to 9 can optionally include that the processor is further configured to download the plurality of button map from at least one of a computing device or a computing cloud, to the memory.

In example 11, the subject-matter of any one of examples 1 to 10 can optionally include that the user input device is one of a computer mouse, a keyboard or a joystick.

In example 12, the subject-matter of any one of examples 1 to 11 can optionally include: a chassis retention member in the socket, the chassis retention member configured to retain the received panel in the socket.

In example 13, the subject-matter of example 12 can optionally include that the chassis retention member includes at least one of magnet or ferromagnetic material for magnetically attracting the received panel.

In example 14, the subject-matter of any one of examples 12 to 13 can optionally include that the chassis retention member includes an indentation for receiving a rib from the panel.

In example 15, the subject-matter of any one of examples 1 to 14 can optionally include: at least one panel from the plurality of panels.

Example 16 is a panel for being releasably received in a socket of a user input device, the panel including: at least one button; a memory storing an identity code readable by a processor of the user input device; and a panel connector configured to transmit the identity code to the user input device.

In example 17, the subject-matter of example 16 can optionally include that the panel connector is configured to bidirectionally communicate with the user input device.

In example 18, the subject-matter of any one of examples 16 to 17 can optionally include that the panel connector is arranged on a first side of the panel, wherein the at least one button is arranged on a second side of the panel, the first side opposing the second side.

In example 19, the subject-matter of any one of examples 16 to 18 can optionally include that the identity code is indicative of a quantity and type of the at least one button.

Example 20 is a computer peripheral device including: the user input device of any one of examples 1 to 15; and the panel of any one of examples 16 to 19.

While embodiments of the invention have been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced. It will be appreciated that common numerals, used in the relevant drawings, refer to components that serve a similar or the same purpose.

The invention claimed is:

1. A user input device comprising:
   a chassis comprising a socket configured to releasably receive a panel;
   a memory storing a plurality of button maps, wherein each button map of the plurality of button maps defines functions of at least one button of a respective panel of a plurality of panels, each of which being receivable in the socket; and
   a processor configured to retrieve from the received panel, an identity code indicative of a quantity and type of the at least one button of the received panel, and further configured to identify a matching button map from the plurality of button maps based on the identity code, wherein the matching button map defines the functions of the at least one button of the received panel.

2. The user input device of claim 1, wherein the processor is further configured to transmit the identity code to a computing device and further configured to receive a user profile associated with the identity code from the computing device, wherein the processor is configured to identify the matching button map based on the received user profile.

3. The user input device of claim 2, wherein the received user profile comprises the matching button map.

4. The user input device of claim 1, wherein upon operation of one button of the at least one button of the received panel, the processor is further configured to determine a message to be transmitted to a computing device, based on the button that is operated and further based on the matching button map.

5. The user input device of claim 1, wherein the plurality of panels comprises a first panel and a second panel, wherein the first panel has a different number of buttons from the second panel.

6. The user input device of claim 1, wherein the plurality of panels comprises a first panel and a second panel, wherein the first panel has different types of buttons from the second panel.

7. The user input device of claim 1, further comprising:
   a chassis connector in the socket, the chassis connector configured to bidirectionally communicate with the received panel.

8. The user input device of claim 7, wherein the chassis connector comprises spring-loaded pins.

9. The user input device of claim 7, wherein the chassis connector is configured to connect to a panel connector of the received panel.

10. The user input device of claim 1, wherein the processor is further configured to download the plurality of button maps from at least one of a computing device or a computing cloud, to the memory.

11. The user input device of claim 1, wherein the user input device is one of a computer mouse, a keyboard or a joystick.

12. The user input device of claim 1, further comprising:
    a chassis retention member in the socket, the chassis retention member configured to retain the received panel in the socket.

13. The user input device of claim 12, wherein the chassis retention member comprises at least one of magnet or ferromagnetic material for magnetically attracting the received panel.

14. The user input device of claim 12, wherein the chassis retention member comprises an indentation for receiving a rib from the panel.

15. The user input device of claim 1, further comprising:
    at least one panel from the plurality of panels.

16. A panel for being releasably received in a socket of a user input device, the panel comprising:
    at least one button;
    a memory storing an identity code readable by a processor of the user input device, wherein the identity code is indicative of a quantity and type of the at least one button; and
    a panel connector configured to transmit the identity code to the user input device.

17. The panel of claim 16, wherein the panel connector is configured to bidirectionally communicate with the user input device.

18. The panel of claim 16, wherein the panel connector is arranged on a first side of the panel, wherein the at least one button is arranged on a second side of the panel, the first side opposing the second side.

19. A computer peripheral device comprising:
    a user input device comprising:
       a chassis comprising a socket configured to releasably receive a panel;
       a memory storing a plurality of button maps, wherein each button map of the plurality of button maps defines functions of at least one button of a respective panel of a plurality of panels, each of which being receivable in the socket; and
       a processor configured to retrieve an identity code from the received panel, and further configured to identify a matching button map from the plurality of button maps based on the identity code, wherein the matching button map defines the functions of the at least one button of the received panel; and
    the received panel, wherein the received panel comprises:
       the at least one button;
       a memory storing the identity code, wherein the identity code is indicative of a quantity and type of the at least one button; and
       a panel connector configured to transmit the identity code to the user input device.

* * * * *